(12) United States Patent
Pedersen

(10) Patent No.: US 11,155,404 B2
(45) Date of Patent: Oct. 26, 2021

(54) COUPLER FOR COUPLING A CRAB POT WITH ANOTHER CRAB POT, AND RELATED SYSTEMS AND METHODS

(71) Applicant: Eric Pedersen, Seattle, WA (US)

(72) Inventor: Eric Pedersen, Seattle, WA (US)

(73) Assignee: Eric Pedersen, Seattle, WA (US)

( * ) Notice: Subject to any disclaimer, the term of this patent is extended or adjusted under 35 U.S.C. 154(b) by 0 days.

(21) Appl. No.: 15/778,091

(22) PCT Filed: Nov. 17, 2016

(86) PCT No.: PCT/US2016/062608
§ 371 (c)(1),
(2) Date: May 22, 2018

(87) PCT Pub. No.: WO2017/087719
PCT Pub. Date: May 26, 2017

(65) Prior Publication Data
US 2018/0339850 A1    Nov. 29, 2018

Related U.S. Application Data

(60) Provisional application No. 62/256,322, filed on Nov. 17, 2015.

(51) Int. Cl.
*B65D 90/00*  (2006.01)
*A01K 69/08*  (2006.01)
*A01K 69/00*  (2006.01)

(52) U.S. Cl.
CPC .......... *B65D 90/0013* (2013.01); *A01K 69/00* (2013.01); *A01K 69/08* (2013.01); *Y10T 24/28* (2015.01)

(58) Field of Classification Search
CPC ........ B65D 90/0013; B65D 2590/0025; B65D 90/0026; Y10T 24/28; B60P 7/132
See application file for complete search history.

(56) References Cited

U.S. PATENT DOCUMENTS 3,389,663 A * 6/1968 Gutridge .................. B61D 3/20
  410/82
3,753,272 A * 8/1973 Laidley .............. B65D 90/0013
  24/287

(Continued)

FOREIGN PATENT DOCUMENTS

WO      2015161316 A2    10/2015

*Primary Examiner* — Robert Sandy
*Assistant Examiner* — Michael S Lee
(74) *Attorney, Agent, or Firm* — John M. Janeway; Janeway Patent Law PLLC

(57) ABSTRACT

A system for coupling a crab pot with another crab pot includes a first receiver mountable to a first crab pot, a second receiver mountable to a second crab pot, and a coupler operable to engage the first receiver and the second receiver to couple the first crab pot with the second crab pot. The first and second receivers, each include a hole. The coupler includes a first holding component operable to hold the first receiver when the first holding component is inserted into the hole of the first receiver, and a second holding component operable to hold the second receiver when the second holding component is inserted into the hole of the second receiver. The coupler also includes an appendage that, while the coupler couples the crab pots, allows a deckhand to grab or stand on to help him/her remain on the pots while he/she climbs on over and/or around the pots.

12 Claims, 7 Drawing Sheets

(56) References Cited

U.S. PATENT DOCUMENTS

| | | | | |
|---|---|---|---|---|
| 3,820,474 | A * | 6/1974 | Backteman et al. | B65D 90/0013 410/82 |
| 3,894,493 | A * | 7/1975 | Strecker | B65D 90/0013 24/287 |
| 4,075,779 | A | 2/1978 | Olafson | |
| 4,195,436 | A | 4/1980 | Moure | |
| 4,741,449 | A * | 5/1988 | Bersani | B65D 90/0013 220/1.5 |
| 5,560,088 | A | 10/1996 | Nitsche et al. | |
| 5,735,639 | A * | 4/1998 | Payne | B65D 88/121 206/386 |
| 6,113,305 | A * | 9/2000 | Takaguchi | B65D 90/0013 403/321 |
| 6,334,241 | B1 * | 1/2002 | Flodin | B65D 90/0013 24/287 |
| 6,390,742 | B1 * | 5/2002 | Breeden | B60P 7/132 410/71 |
| 7,056,081 | B2 * | 6/2006 | Kelly | B65D 88/022 220/1.5 |
| 2003/0206781 | A1 * | 11/2003 | Moore | B64D 9/00 410/46 |
| 2009/0307827 | A1 * | 12/2009 | Aspray | A42B 3/046 2/425 |
| 2010/0018017 | A1 * | 1/2010 | Joo | B65D 90/0013 24/697.1 |
| 2011/0036742 | A1 * | 2/2011 | Fukui | B65D 90/0013 206/509 |
| 2012/0248105 | A1 * | 10/2012 | Leong | B65D 88/524 220/7 |
| 2014/0314511 | A1 * | 10/2014 | Reynard | B65D 90/0013 410/82 |
| 2015/0052708 | A1 | 2/2015 | Bederke | |

* cited by examiner

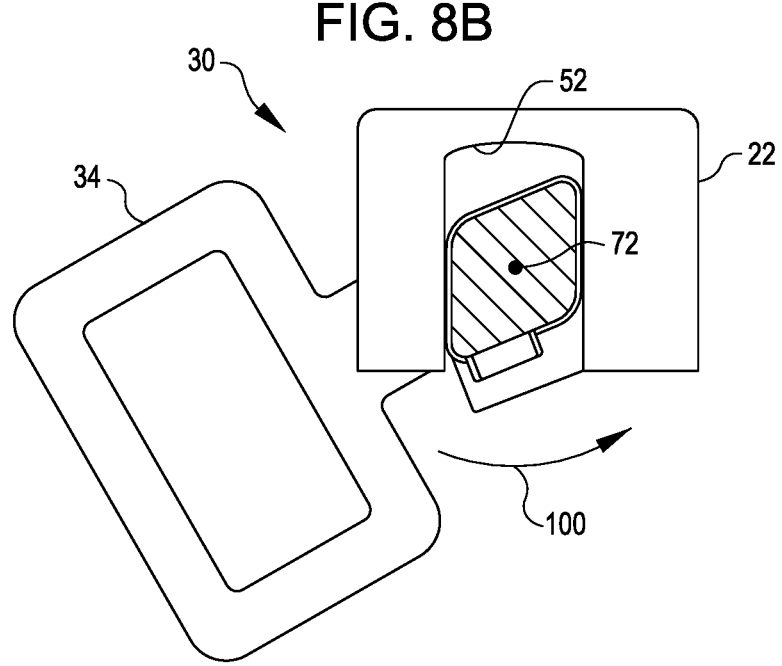
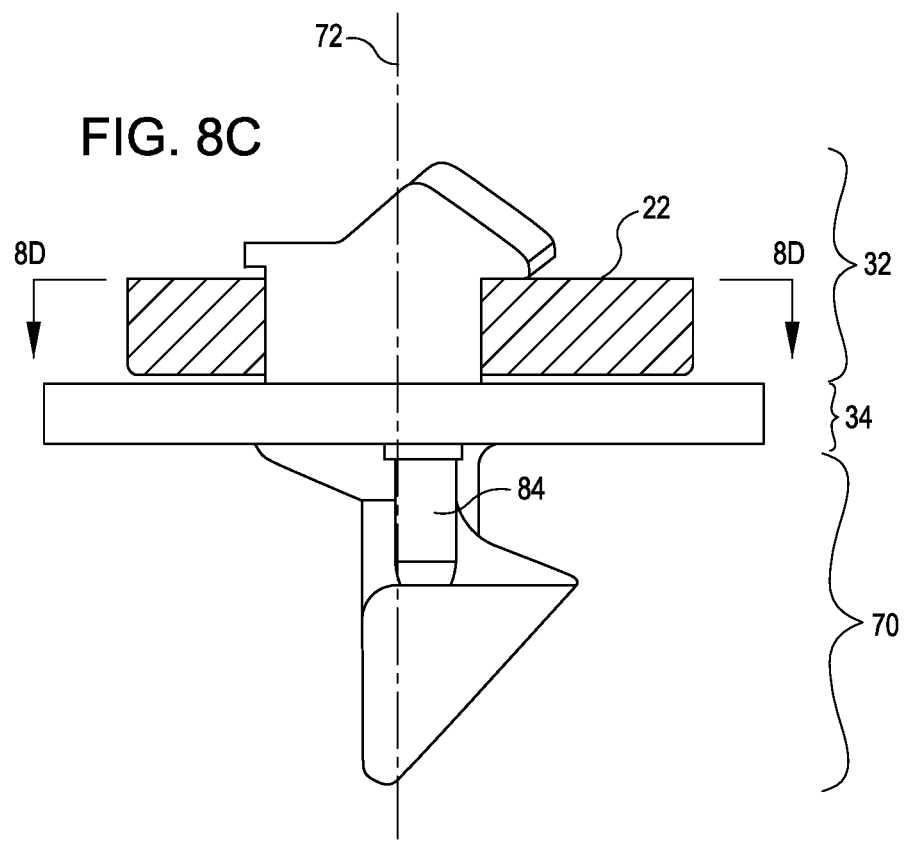

COUPLER FOR COUPLING A CRAB POT WITH ANOTHER CRAB POT, AND RELATED SYSTEMS AND METHODS

CROSS REFERENCE TO RELATED APPLICATION AND CLAIM OF PRIORITY

This application claims priority from commonly owned U.S. Provisional Patent Application 62/256,322 filed 17 Nov. 2015, and titled "A Connector For Holding Together Two Adjacent Crab Pots Positioned On A Boats Deck, And Related Systems And Methods", presently pending and incorporated by reference.

BACKGROUND

Commercial crab fishing is labor intensive and dangerous work carried out in some of the most extreme environments possible. For many years, commercial fishing has topped the Bureau of Labor Statistics' list of jobs with the most fatalities—and crabbing in Alaskan waters is by far the most lethal form of fishing. The coast of Alaska and the Aleutian Islands often endure temperatures that are well below freezing and seas that are very rough. These conditions combined with the heavy equipment used to commercially fish for crab compound the dangers that commercial fishermen encounter when crabbing. Unlike the crab pots used by weekend pleasure boaters, a large commercial crab pot is generally 7 feet by 8 feet and weighs about 800-pounds empty.

A typical crab fishing expedition launches off the coast of Alaska and travels to a desired crabbing ground. At the desired ground, each of the extremely large, heavy pots are hoisted by a crane onto a pot launcher where a deckhand baits the pot. After the pot is baited, the pot launcher tilts the pot over the ship's gunnel to allow the pot to drop into the ocean. The crane is operated by a deckhand who maneuvers the end of the crane close to the pot to be hoisted. While the crane operator maneuvers the end of the crane, another deckhand climbs the stack of pots on the ship's deck, unties from the stack the pot to be hoisted, and then attaches the pot to the crane by hand with a rope or hook. When the deck of the vessel is pitching from stormy seas and/or the pots are covered in ice, climbing the stack of pots, un-tying a pot from the stack and then fastening one of them to the crane can be very dangerous.

Similarly, storing each of the pots on deck after fishing for crab, exposes deckhands to very dangerous conditions. In addition to reversing the loading process discussed in the previous paragraph, the deckhand secures the recently positioned pot to other pots already positioned (stacked) on the deck for storage. The pots are often stacked four or five high and to secure the pot to the stack the deckhand typically ties the pot to the adjacent pot in a couple locations. Doing this while the deck is pitching in sub-zero temperatures and the crane is positioning the next pot for storage further exposes the deckhand to a very dangerous condition.

SUMMARY

In an aspect of the invention, a system for coupling a crab pot with another crab pot includes a first receiver mountable to a first crab pot, a second receiver mountable to a second crab pot, and a coupler operable to engage the first receiver and the second receiver to couple the first crab pot with the second crab pot. The first and second receivers, each include a hole. The coupler includes a first holding component operable to hold the first receiver when the first holding component is inserted into the hole of the first receiver, and a second holding component operable to hold the second receiver when the second holding component is inserted into the hole of the second receiver. The coupler also includes an appendage that, while the coupler couples the crab pots, allows a deckhand to grab or stand on to help him/her remain on the pots while he/she climbs on, over and/or around the pots.

With the system, each crab pot on a vessel may be secured to an adjacent crab pot without a deckhand manually tying the pots together, which also allows the crab pots to be separated without a deckhand manually untying the pots. And, with the coupler's appendage, a deckhand may safely climb on, over and/or around crab pots stacked on the vessel's deck to remove the build-up of ice on the pots and/or access the pots for any other reason. Thus, the system reduces the need for a deckhand to climb on, over and/or around stacked crab pots in heavy seas and sub-zero temperatures, and, if the deckhand does need to climb on, over and/or around stacked crab pots, the coupler's appendage provides the deckhand additional security while climbing.

In another aspect of the invention, a method for coupling a crab pot with another crab pot includes inserting a first holding component of a coupler into a receiver of a first crab pot; inserting a second holding component of the coupler into a receiver of a second crab pot; and positioning an appendage of the coupler such that the appendage extends beyond the first and second crab pots.

Figure 1:
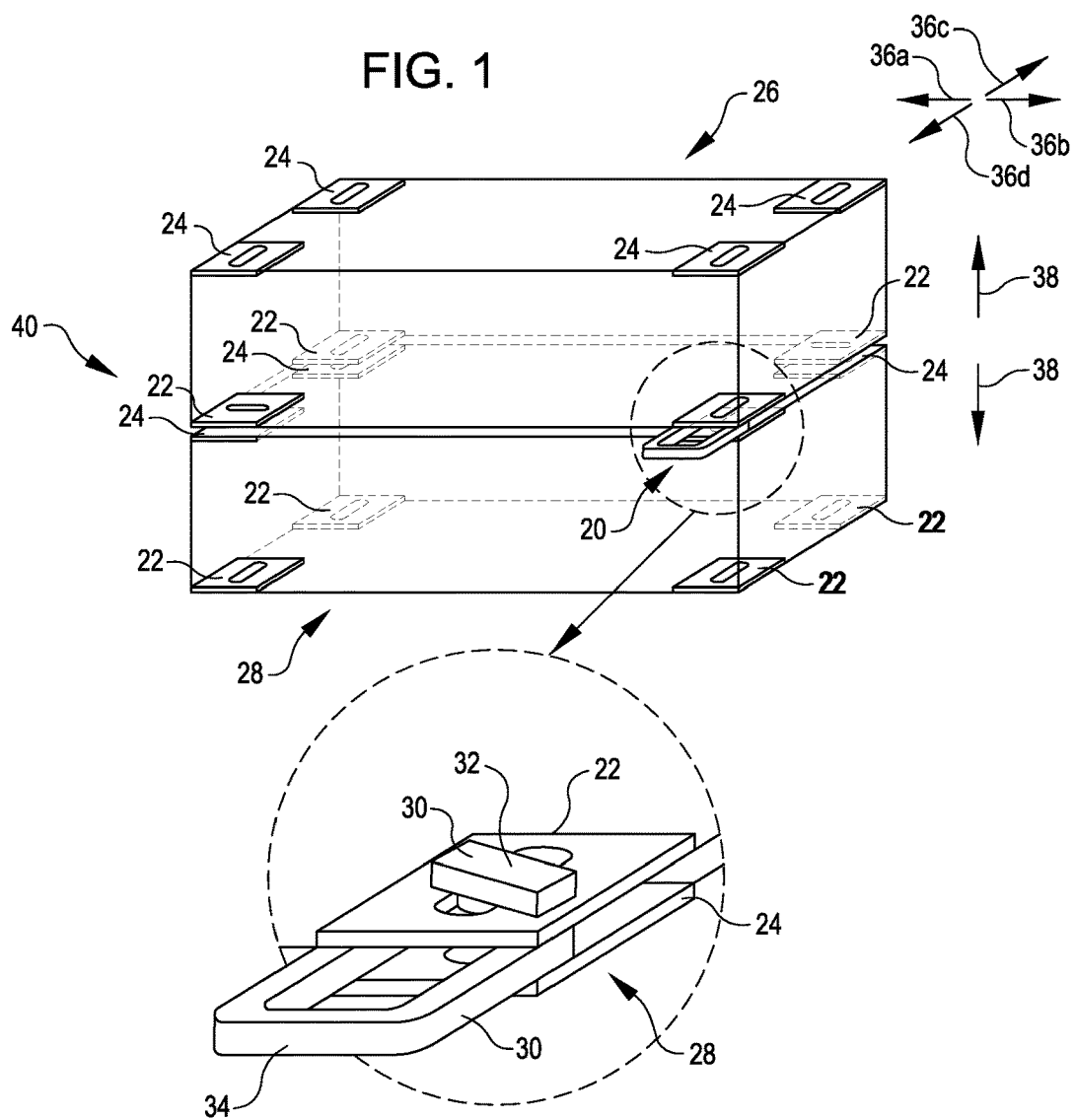
FIG. 1 shows a perspective view of a system for coupling two crab pots together, according to an embodiment of the invention.

Each of FIGS. 3-7 shows a different view of a coupler shown in FIG. 1, according to an embodiment of the invention.

Each of FIGS. 8A-8F shows a step in the process for coupling two crab pots together with the coupler shown in FIGS. 3-7, according to an embodiment of the invention.

Figure 9:
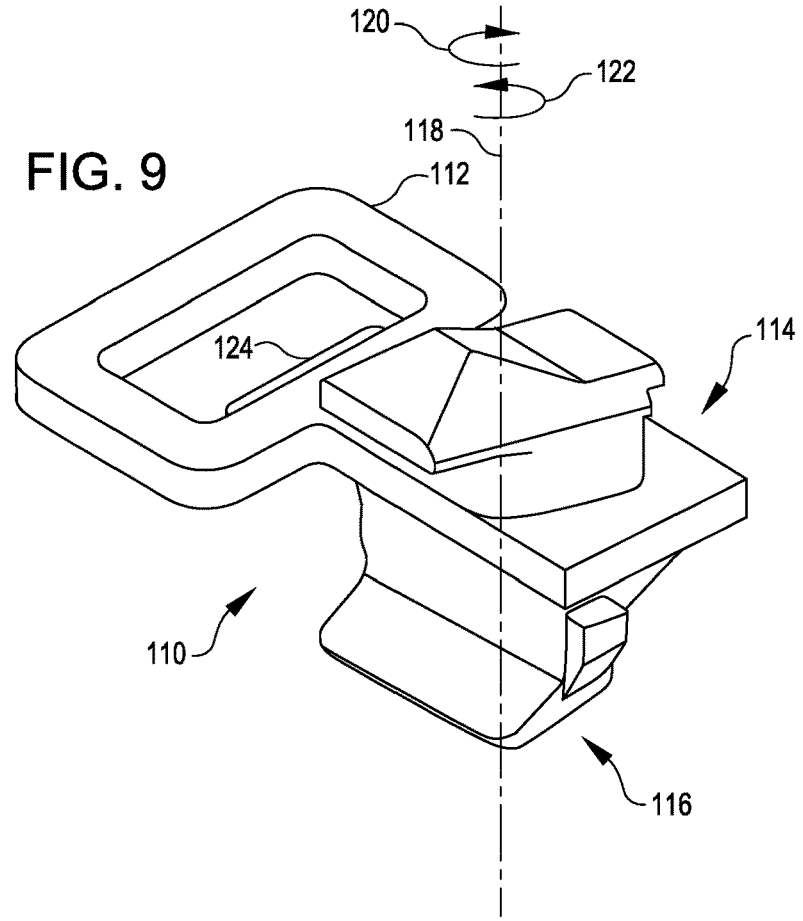

FIG. 9 shows a coupler, according to another embodiment of the invention.

DETAILED DESCRIPTION

FIG. 1 shows a perspective view of a system 20 coupling two crab pots together, according to an embodiment of the invention. The system 20 includes a first receiver 22 and a second receiver 24 (both discussed in greater detail in conjunction with FIG. 2) each mounted to a respective one of two crab pots 26 and 28. The system 20 also includes a coupler 30 (discussed in greater detail in conjunction with FIGS. 3-7) that releasably engages both receivers to couple the crab pot 26 with the crab pot 28. Although two crab pots 26 and 28 are shown, more crab pots may be coupled together to form a taller and/or wider stack. Also, although one coupler 30 is shown, the system 20 may include a coupler 30 for each set of receivers 22 and 24 shown, and each crab pot 26 and 28 may include more or fewer receivers 22 and 24. The coupler 30 includes a first holding component 32 that releasably engages the receiver 22, a second holding component (not shown here but shown in FIGS. 3-7) that releasably engages the receiver 24, and an appendage 34 that a deckhand (not shown) may grab with his/her hand or stand on with his/her foot, while he/she climbs on, over and/or around the crab pots 26 and 28. When the coupler 30 engages the first and second receivers 22 and 24, the two crab pots 26 and 28 are held together and restrained from moving across each other in the directions indicated by the arrows 36a-36d, and from moving away from each other in the directions indicated by the arrows 38.

With the system 20, each crab pot on a ship may be secured to an adjacent crab pot without a deckhand manually tying the pots together, which also allows the crab pots to be separated without a deckhand manually untying the pots. And, with the coupler's appendage 34, a deckhand may safely climb on, over and/or around crab pots stacked on a ship's deck to remove the build-up of ice on the pots and/or access the pots for any other reason. Thus, the system 20 reduces the need for a deckhand to climb on, over and/or around stacked crab pots in heavy seas and sub-zero temperatures, and, if the deckhand does need to climb on, over and/or around stacked crab pots, the coupler's appendage 34 provides the deckhand additional security while climbing.

Each of the receivers 22 and 24 may be mounted to their respective crab pots 26 and 28 in any desired manner. For example, in this and other embodiments each of the receivers 22 and 24 are welded to the frame of their respective crab pots 26 and 28. In such embodiments, the receivers 22 and 24 are fixed to their respective crab pots 26 and 28. In other embodiments, each of the receivers 22 and 24 may be releasably mounted to their respective crab pots 26 and 28. In such embodiments, each of the receivers 22 and 24 may be bolted to the frame of their respective crab pots 26 and 28. Then, when the crab pots are not being used, the receivers 22 and 24 may be removed from the pots and releasably mounted to other crab pots or containers and used to couple the other crab pots or containers together.

In addition, each of the receivers 22 and 24 may be mounted to their respective crab pots 26 and 28 at any desired location on their respective crab pots 26 or 28. For example, in this and other embodiments each of the crab pots 26 and 28 are rectangular, and each of the receivers 22 and 24 are mounted to a respective corner of their respective crab pots 26 and 28. More specifically, each of four receivers 22 are mounted at a respective one of the four bottom corners of the crab pot 26, and each of another four receivers 22 are mounted at a respective one of the four bottom corners of the crab pot 28. Similarly, each of four receivers 24 are mounted at a respective one of the four top corners of the crab pot 26, and each of another four receivers 24 are mounted at a respective one of the four top corners of the crab pot 28. In other embodiments, one or more additional receivers 22 and 24 may be mounted on the crab pots' frames between any of two adjacent corners.

Still referring to FIG. 1, each pair of receivers 22 and 24 that a coupler 30 engages may be oriented relative to the crab pots 26 and 28 to be coupled, as desired. As discussed in greater detail in conjunction with FIGS. 8A-8F, the coupler's first holding component 32 restrains the movement of the first receiver 22, and thus the crab pot 26, from moving relative to the second receiver 24, and thus the crab pot 28, in the directions indicated by the arrows 36a and 36b, but does not provide much resistance to the movement of the first receiver 22 in the directions indicated by the arrows 36c and 36d. So, to provide more restraint to the movement of the crab pot 26 relative to the crab pot 28 in the directions indicated by the arrows 36c and 36d, one or more of a pair of receivers 22 and 24 that a coupler 30 engages, may be clocked 90 degrees relative to the receivers 22 and 24 shown with the coupler 30 in FIG. 1. For example, in this and other embodiments two of the four bottom corners of the crab pot 26 that together establish a diagonal across the bottom of the crab pot 26, include their respective receiver 22 clocked 90 degrees relative to the receiver 22 shown with a coupler 30 engaged. In such embodiments, the appendage 34 of the coupler 30 may extend from the first and second holding components at an angle that is also clocked 90 degrees relative to the coupler 30 shown in FIG. 1 so that when a coupler 30 couples the crab pots 26 and 28 at the corner 40 of the crab pot 26, the appendage 34 extends in the same direction as the appendage 34 of the coupler 30 shown in FIG. 1.

Figure 2:
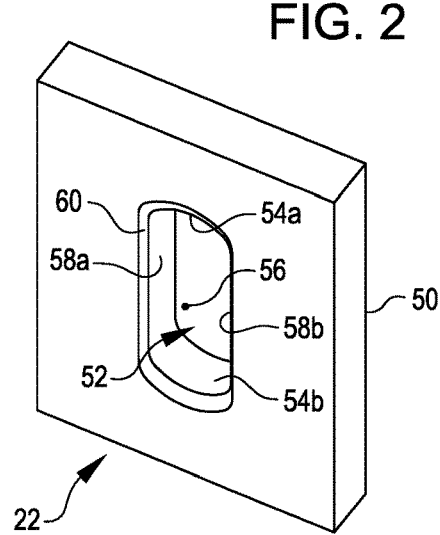
FIG. 2 shows a perspective view of a receiver shown in FIG. 1, according to an embodiment of the invention.
Figure 3:
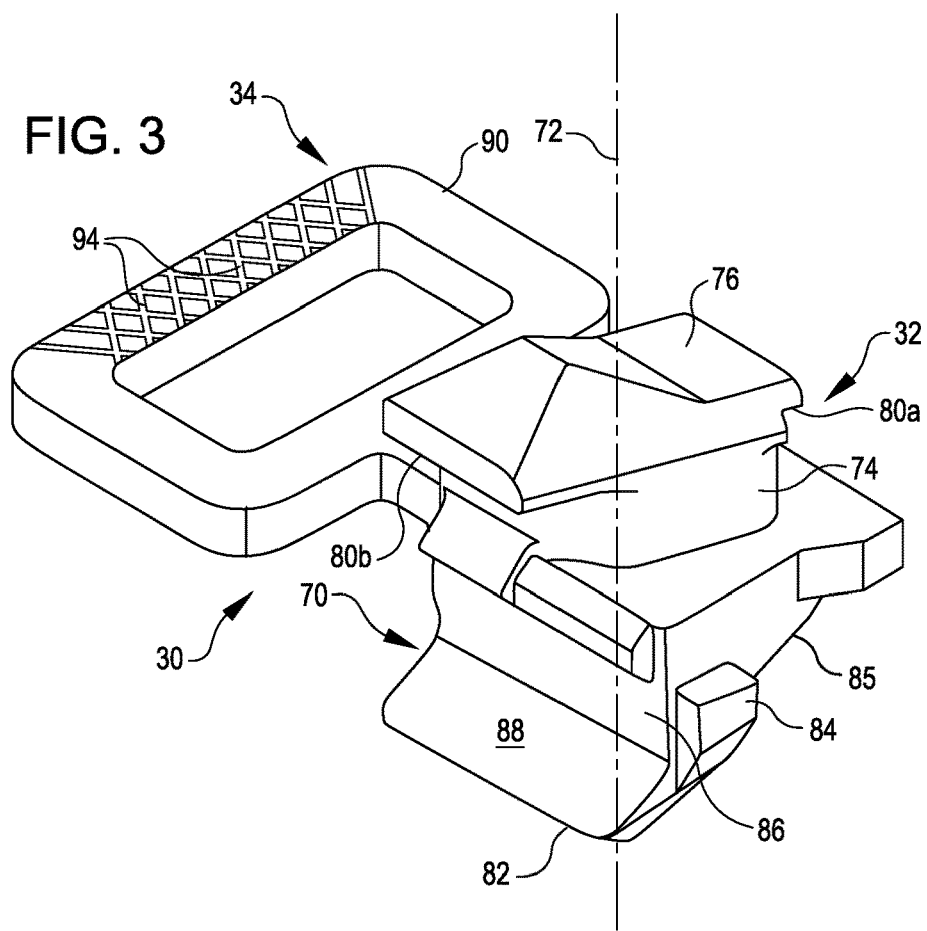
Figure 4:
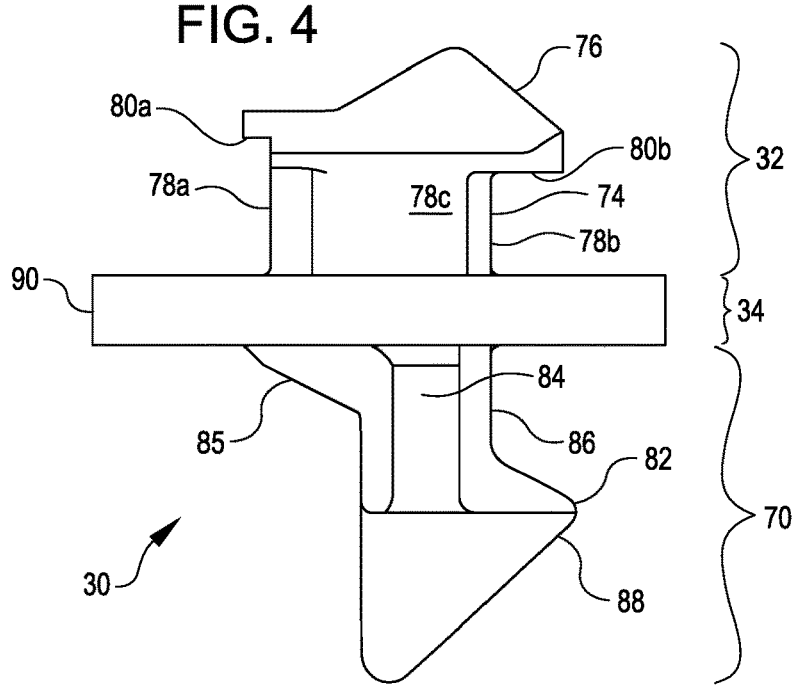
Figure 5:
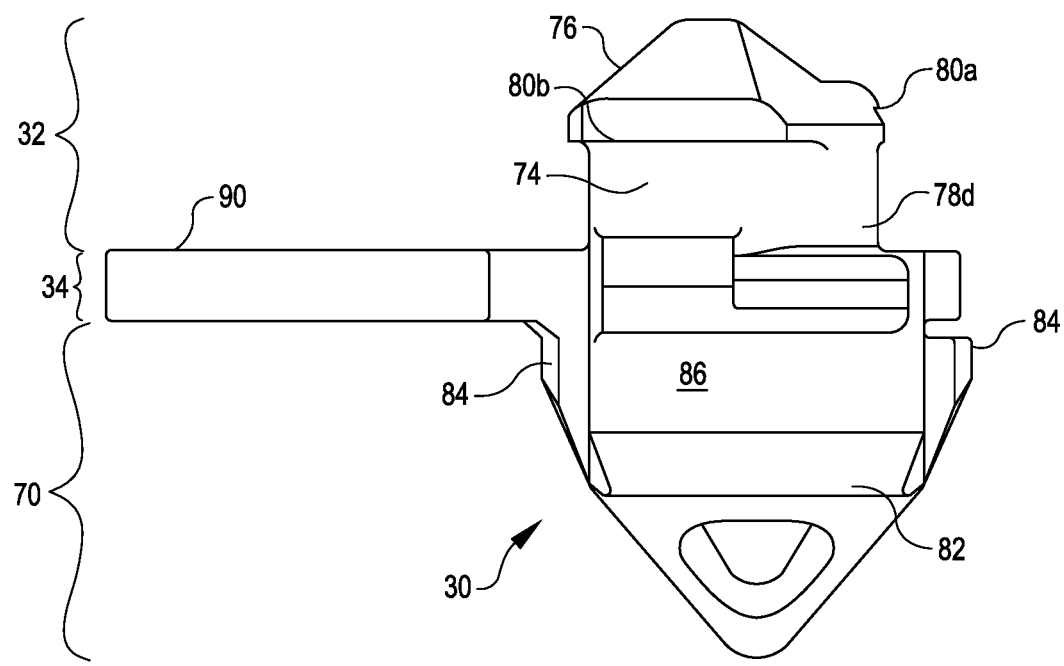
Figure 6:
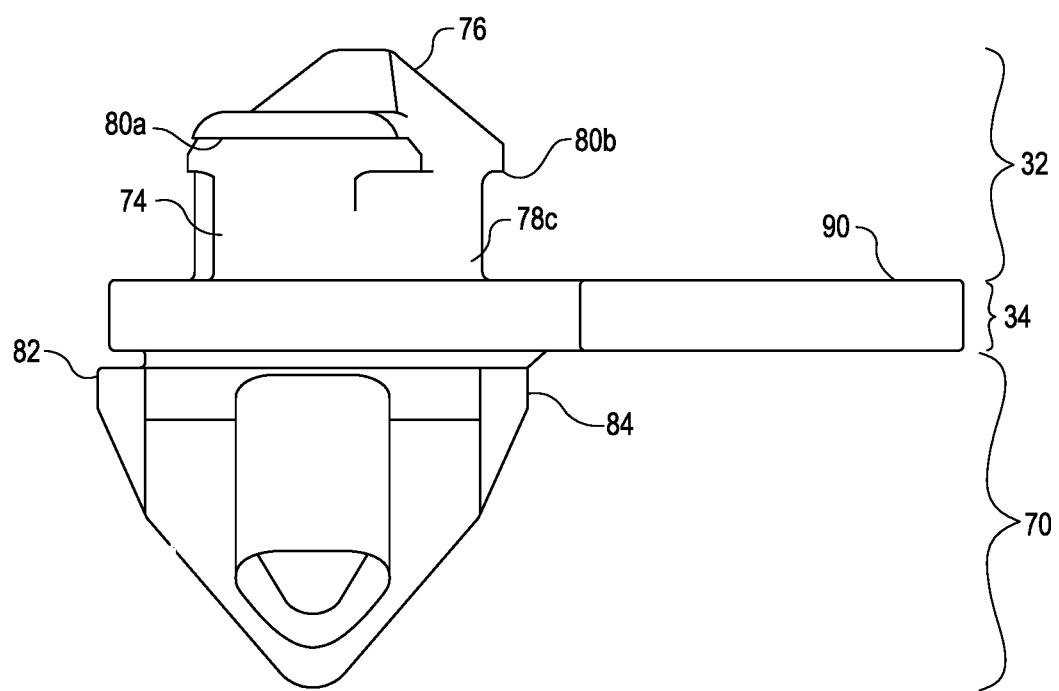
Figure 7:
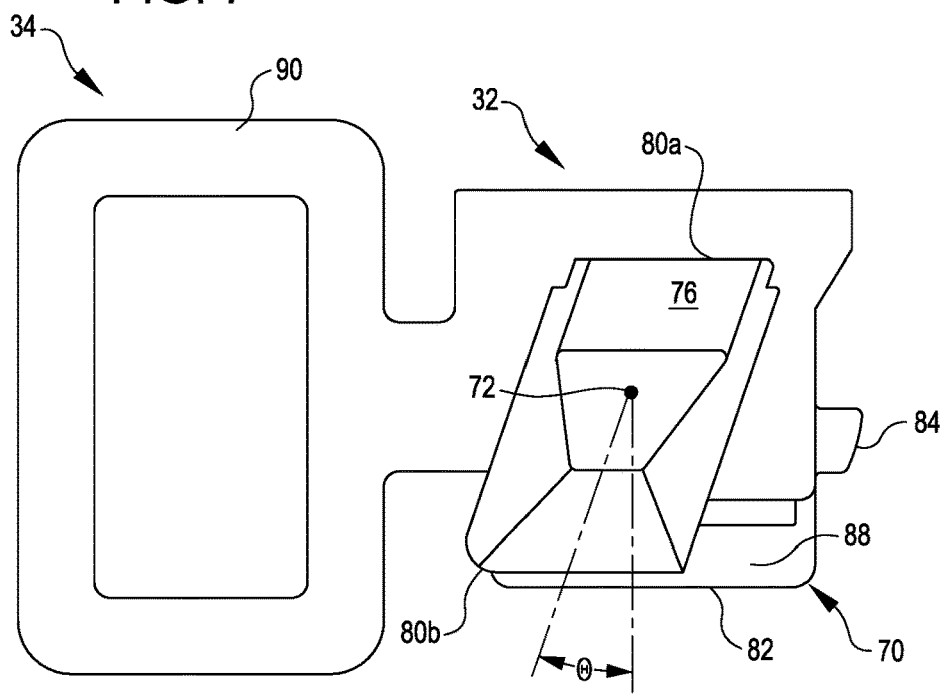

FIG. 2 shows a perspective view of the receiver 22 of the system 20 shown in FIG. 1, according to an embodiment of the invention. In this and other embodiments, the receiver 22 is identical to the receiver 24 to allow either the first holding component 32 (FIG. 1) or the second holding component (FIGS. 3-7) to engage either receiver 22 or 24. This allows one to use the coupler 30 to couple the crab pots 26 and 28 when the crab pot 26 is above the crab pot 28 as shown in FIG. 1, or when the crab pot 28 is above the crab pot 26. Thus, a deckhand stacking crab pots for the return to port or the journey to another crabbing ground does not have to worry about stacking the pots in a specific stacking order or sequence to stack all of the pots on the ship's deck.

The receiver 22 includes a body 50 having a hole 52 configured to receive either the first holding component 32 (FIG. 1) of the coupler 30 (FIG. 1), or the second holding component of the coupler 30. In this and other embodiments, the hole 52 has an oblong shape to allow the first holding component 32 to be inserted into the hole 52 when the first holding component 32 is set in a specific position (discussed in greater detail in conjunction with FIGS. 8A-8F), and then to be rotated relative to the hole 52 to lock the first holding component 32 with the receiver's body 50. More specifically, the hole 52 is defined by two curved ends 54a and 54b that are each defined by the perimeter of circle whose center 56 lies in the hole 52. The hole 52 is also defined by two sides 58a and 58b that are straight and about 1.7 inches apart. The hole 52 also includes a chamfer 60 that extends around the perimeter of the hole 52 to facilitate the insertion of the coupler's first holding component 32 or second holding component into the hole 52.

Other embodiments are possible. For example, the hole 52 may be configured differently. The hole 52 may be larger or smaller in scale, and/or the sides 58a and 58b may be closer or farther apart and may be shorter or longer between the curved ends 54a and 54b. In addition, the curved ends 54a and 54b may include a deeper or shallower curve. In addition, the receiver 22 may include a box having six sides defining and interior cavity, and having the hole 52 located in one of the sides.

The receiver 22 may be made of any desired material capable of handling the harsh conditions that a crab pot typically experiences. For example, in this and other embodiments the receiver includes conventional stainless steel. In other embodiments, the receiver may include a plastic.

Each of FIGS. 3-7 shows a different view of the coupler 30 shown in FIG. 1, according to an embodiment of the invention. The coupler 30 includes a first holding component 32, a second holding component 70, and an appendage 34. As previously mentioned, in this and other embodiments the first holding component 32 and the second holding component 70 are each sized and configured to engage the hole 52 (FIG. 2) so that the coupler 30 may engage the hole 52 with either the first or the second holding component 32 or 70.

The first holding component 32, the second holding component 70 and the appendage 34 may be oriented relative to each other as desired. For example, in this and other embodiments the first holding component 32 and the second holding component 70 are aligned along an axis 72, and the first holding component 32 is clocked or rotated a number of degrees, θ (here 20 degrees) (see FIG. 7), about the axis 72 relative to the second holding component 70. This allows one to insert the first holding component 32 into the hole 52 (FIG. 2) and then lock the first holding component to the receiver 22 (FIG. 1), as discussed in conjunction with FIGS. 8A-8F. The appendage 34 extends substantially perpendicular to the axis 72 from between the first holding component 32 and the second holding component 70, so that when the coupler 30 engages two receivers 22 and 24, the appendage 34 may extend out between the receivers 22 and 24, and beyond the crab pots that the receivers 22 and 24 are mounted to.

Other embodiments are possible. For example, the first holding component 32 may be clocked more and less than 20 degrees relative to the second holding component 70, and the appendage 34 may extend away from the first and second holding components 32 and 70, respectively, at an angle that is not perpendicular to the axis 72.

The first holding component 32 may be sized and configured as desired. For example, in this and other embodiments the first holding component 32 includes a body 74 and an end 76. The body 74 has a cross-sectional area in the shape of a parallelogram (See FIG. 8B), and sides 78a, 78b, 78c and 78d. The end 76 has a lip 80a and 80b. The length of the body 74 along the axis 72 is very close to but is not less than the depth of the receiver's hole 52, and the lips 80a and 80b are sized to extend the length of the end 76 across the axis 72 to exceed the distance between the sides 58a and 58b of the hole 52. When one inserts the first holding component 32 into the hole 52, the sides 78c and 78d are adjacent the sides 58a and 58b (FIG. 2) of the hole 52, and the end 76 moves through the hole 52. And when one rotates the first holding component 32 to lock it to the receiver 22 (FIG. 2), the sides 78a and 78b are adjacent the hole's side 58a and 58b, and the end's lips 80a and 80b contact the body 50 (FIG. 2) of the receiver 22 to keep the first holding component 32, and thus the coupler 30, from disengaging the receiver 22.

The second holding component 70 may also be sized and configured as desired. For example, in this and other embodiments, the second holding component 70 includes a hook 82, two shoulders 84a and 84b, and a slope 85. The hook 82 has a first portion 86 from which each of the shoulders 84a and 84b extend, and a second portion 88. The first portion 86 extends away from the first holding component 32 along the axis 72, and has a length that is very close to but is not less than the depth of the receiver's hole 52. The first portion 86 and the shoulders 84a and 84b are sized such that the width of the first portion 86 and the distance that each shoulder 84a and 84b extends provide a total combined width that is very close to but does not exceed the distance between the two curved ends 54a and 54b (FIG. 2) of the hole 52. When one inserts the second holding component 70 into the hole 52, the hook's second portion 88 moves through the hole 52. And, when the chamfer 60 of the hole 52 contacts the slope 85, the second portion 88 is urged over the body 50 of the receiver 24 to keep the second holding component 70, and thus the coupler 30, from disengaging the receiver 24.

The appendage 34 may be configured as desired to support a deckhand. For example, in this and other embodiments, the appendage 34 includes a loop 90. The loop 90 is sized to allow one to insert the fingers of one's hand through the loop 90 to grasp the loop 90, or to allow one to stand on the loop 90. More specifically, the loop 90 is about five inches long, about 2.5 inches wide, and extends about 3.5 inches away from the first and second holding components 32 and 70, respectively, in a direction perpendicular to the axis 72. The loop 90 has a square cross-section that is about 0.5 inches by 0.5 inches. In addition, the loop 90 has a surface 92 configured to provide traction. For example, the loop 90 includes a set of grooves 94 that are arranged in a cross-cut pattern and allow an edge of boot's sole or the material of a glove to enter one or more of the grooves 94 and snag the edge of the one or more grooves 94.

Other embodiments are possible. For example, the loop 90 may have any desired length and width, and may extend any desired distance away from the first and second holding components 32 and 70, respectively. In addition, the appendage 34 may include other shapes that may or may not have a passage through which one can extend one's fingers through. For example, the appendage may be one or more bars that extend away from the first and second holding components 32 and 70, respectively. In addition, the appendage 34 may extend at an angle other than 90 degrees relative to the axis 72.

Still referring to FIGS. 3-7, the coupler 30 may include any desired material capable of handling the harsh conditions that a crab pot typically experiences. For example, in this and other embodiments the coupler 30 includes conventional stainless steel. In other embodiments, the coupler 30 may include a plastic. In still other embodiments, the coupler 30 may include a durable material that has a large coefficient of friction, and thus can generate a large amount of friction between the deckhand's boot or glove when in use.

Each of the FIGS. 8A-8F shows a step in a process for coupling two crab pots 26 and 28 (FIG. 1) together with the coupler 30 (FIGS. 1 and 3-7), according to an embodiment of the invention.

Figure 8A:
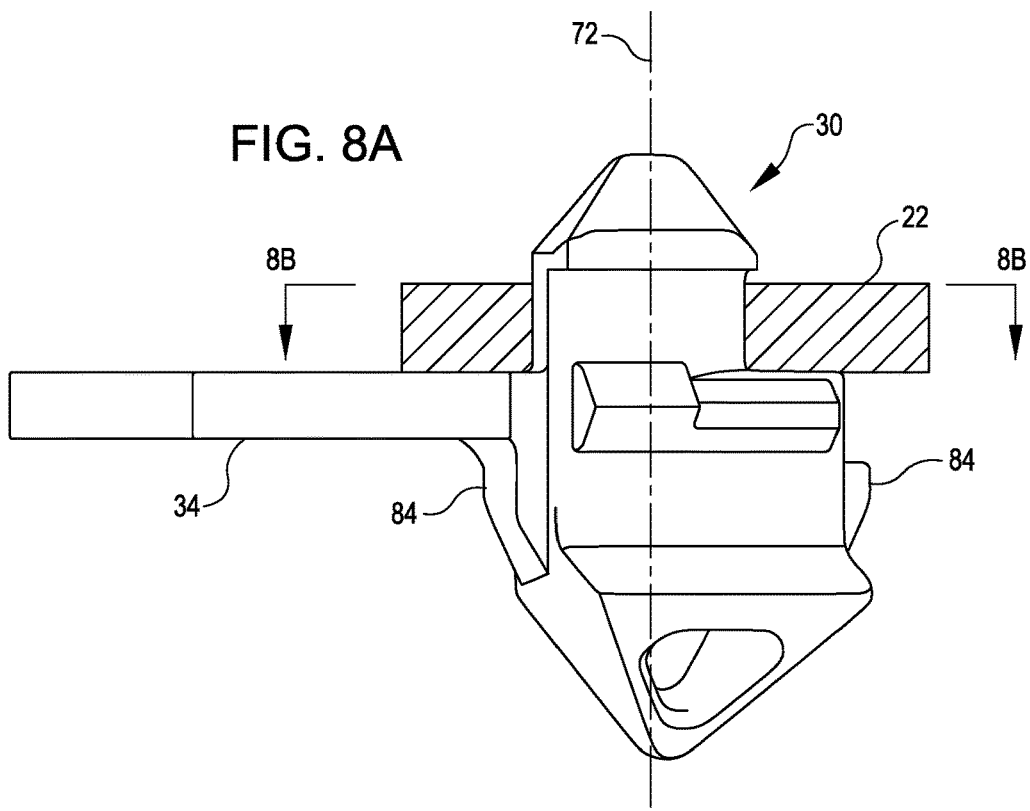
Figure 8D:
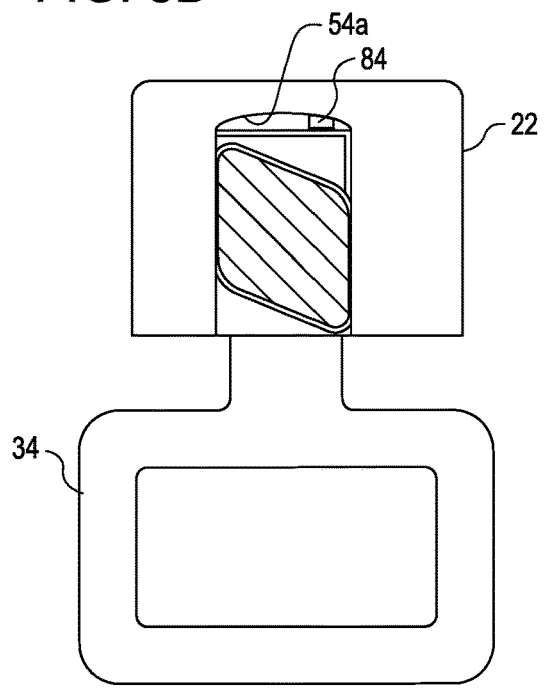
Figure 8E:
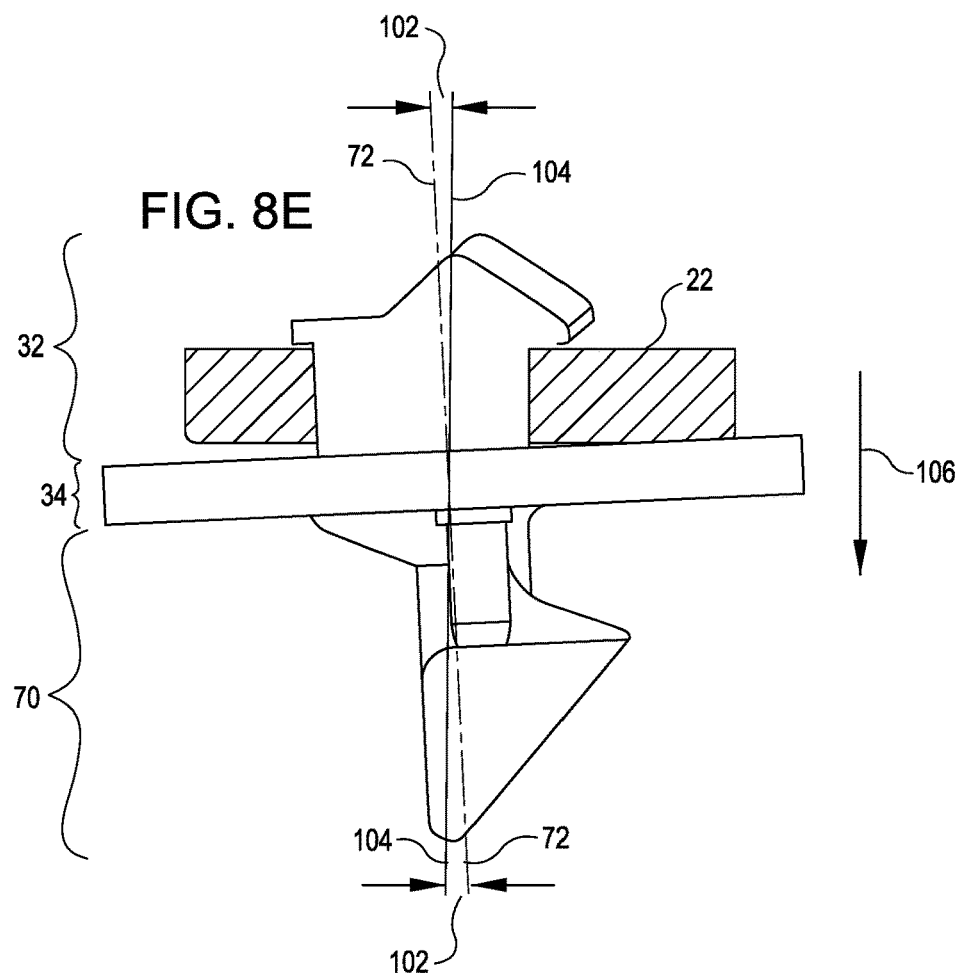
Figure 8F:
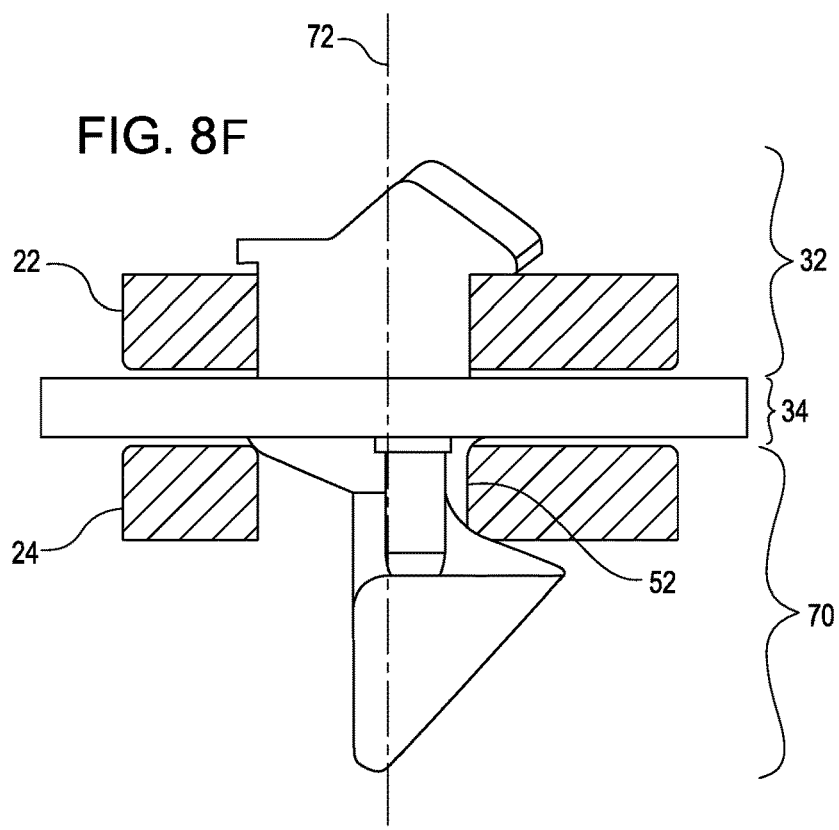

In this and other embodiments, the process begins by one positioning the first holding component 32 adjacent the hole 52 of the receiver 22 so that the end 76 (FIGS. 3-7) and body 74 (FIGS. 3-7) may be inserted into the hole 52. FIG. 8B shows the clocked orientation of this first position but shows the first holding component 32 already inserted into the hole 52, not adjacent the hole 52 just before insertion. After locating the first holding component 32 in this first position, one inserts the first holding component 32 into the hole 52. FIGS. 8A and 8B each show the coupler 30 inserted into the hole 52 at this point in the process. Next, the coupler 30 is rotated about the axis 72 in the direction of the arrow 100 about seventy degrees to lock the first holding component 32 inside the hole 52 of the receiver 22. FIGS. 8C and 8D each show the coupler 30 locked in this position. Then, the coupler 30 is allowed to clock to an angle 102 away from the vertical axis 104. FIG. 8E shows the second holding component 70 in the slightly clocked position. In this and other embodiments, the angle 102 is about five degrees. In this position, the second holding component 70 is ready to be inserted into the hole 52 of the second receiver 24 of the second crab pot 28 by moving toward the second receiver's hole 52 in the direction of the arrow 106. Then, one inserts the second holding component 70 into the hole 52 of the receiver 24. FIG. 8F shows the second holding component 70 inserted in to the second receiver's hole 52. As the second holding component 70 first enters the hole 52, the chamfer 60 (FIG. 2) of the second receiver 24 contacts the second portion 88 (FIGS. 3, 4 and 7) of the second holding component 70 and pushes the coupler 30 back into alignment with the vertical axis 104. Then, the second holding component 70 continues through the hole 52 until the second portion 88 exits the other side of hole 52, as shown in FIG. 8F. In this position, the shoulders 84 of the second holding component 70 contact or are very close to the curved end 54a to restrain movement of the crab pot 28 in the directions of the arrows 36c and 36d (FIG. 1). To uncouple the two receivers 22 and 24, the receiver 22 of the first pot 26, which engages the first holding component 32, is moved in the direction opposite the direction indicated by the arrow 106. The amount of force required to uncouple the second receiver 24 from the second holding component 70 is greater than the amount of force required to insert the second holding component into the receiver's hole 52 to engage the second receiver 24. When two or more couplers 30 couple the first crab pot 26 to the second crab pot 28, all of the couplers 30 should be moved simultaneously in the direction opposite the direction indicated by the arrow 106 to uncouple the first pot 26 from the second pot 28. When the combination of the couplers 30 experiences any other type of loading, the couplers 30, together, hold the two pots 24 together.

Other embodiments are possible. For example, the first position in which the first holding component 32 needs to be in to insert the first holding component 32 into the first receiver's hole 52 may be clocked relative to the hole 52 at an angle less than 20 degrees or more than 20 degrees. In addition, the amount that one rotates the coupler 30 to lock the first holding component 32 inside the hole 52 may be less than 70 degrees or more than 70 degrees. Also, the amount that the coupler 30 clocks relative to the vertical axis 104 before the second holding component 70 is inserted into the second receiver's hole 52 may be zero degrees, less than five degrees, or more than five degrees.

FIG. 9 shows a coupler 110, according to another embodiment of the invention. The coupler 110 is similar to the coupler 30 except that the location of the appendage 112 relative to the first holding component 114 and the second holding component 116 is adjustable. For example, in this and other embodiments the appendage 112 may be rotated about the axis 118 in either of the directions indicated by the arrows 120 and 122 and held at any position to allow one to locate the appendage 112 in a desired position that one can easily access while one climbs on, over and/or around stacked crab pots coupled with the coupler 110. More specifically, the appendage 112 includes a ratchet and pawl mechanism (not shown). When the appendage 112 is in a desired position, one allows a spring to urge the pawl to engage a tooth of the ratchet to prevent the ratchet, and thus the appendage 112, from rotating about the axis 118. To disengage the pawl from the ratchet, one pushes the bar 124 toward the first and second holding components 114 and 116, respectively, to move the pawl away from the ratchet.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A coupler for coupling a crab pot with another crab pot, the coupler comprising:
    a first holding component operable to hold a crab pot when the first holding component is disposed in a receiver of the crab pot;
    a second holding component operable to hold another crab pot when the second holding component is disposed in a receiver of the other crab pot;
    an appendage positioned between and extending from the first holding component and the second holding component, the appendage including a loop;
    wherein each of the first holding component, the second holding component, and the appendage is not moveable relative to the other two;
    wherein the first holding component is aligned with the second holding component along a vertical axis that passes through both holding components, and is clocked about the vertical axis relative to the second holding component such that before disposing the second holding component in a receiver of the second holding component's respective crab pot, the first holding component is inserted into a receiver of the first holding component's respective crab pot and then locked in the receiver by rotating the coupler about the vertical axis;
    wherein the first holding component is configured to allow the coupler to tilt about another axis orthogonal to the vertical axis after the first holding component is locked in the receiver of its respective crab pot, to allow the second holding component to be inserted into the receiver of its respective crab pot to couple the two crab pots; and
    wherein the loop is sized and configured such that when the coupler couples the two crab pots, the coupler's appendage extends beyond the first and second crab pots to allow a deckhand to stand on the loop with a portion of his/her foot while the deckhand climbs on the crab pots.

2. The coupler of claim 1 wherein the first holding component includes:
    a body that, when the first holding component is locked in a receiver of the crab pot, extends through a hole of the receiver, and
    an end that, when the first holding component is locked in the receiver of the crab pot, is positioned above and adjacent the receiver's hole.

3. The coupler of claim 2 wherein, when the first holding component is locked in a receiver of a crab pot and the receiver is urged in a direction that is substantially perpendicular to the body's extension through the hole, the body contacts a side of the receiver that defines the hole.

4. The coupler of claim 2 wherein, when the first holding component is locked in a receiver of a crab pot and the receiver is urged in a direction that is substantially parallel to the body's extension through the hole, the end contacts a side of the receiver.

5. The coupler of claim 1 wherein the first holding component includes:
    an end sized and configured to allow passage of the end through the hole of the crab pot's receiver when the first holding component is located in a first position, and to prevent insertion of the end into the hole when the first holding component is not located in the first position, and
    a body sized and configured to allow insertion of the body into a hole of a receiver of a crab pot when the first holding component is located in the first position.

6. The coupler of claim 1 wherein the second holding component includes a hook, that, when the second holding component is disposed in a receiver of a crab pot, extends through a hole of the receiver.

7. The coupler of claim 6 wherein, when the second holding component is disposed in a receiver of a crab pot and the receiver is urged in a direction that is substantially perpendicular to the hook's extension through the hole, a portion of the hook that is disposed in the hole contacts a side of the receiver that defines the hole.

8. The coupler of claim 6 wherein, when the second holding component is disposed in a receiver of a crab pot and the receiver is urged in a direction that is substantially parallel to the hook's extension through the hole, another portion of the hook contacts a side of the receiver.

9. The coupler of claim 1 wherein the second holding component includes a hook sized and configured to allow insertion of the hook into a hole of a receiver of a crab pot when the second holding component is located in a second position, and to prevent insertion of the hook into the hole when the second holding component is not located in the second position.

10. The coupler of claim 9 wherein the second holding component is located in the second position when the first holding component is rotated about 70 degrees counter-clockwise from a first position of the first holding component.

11. The coupler of claim 1 wherein the loop of the appendage is sized to allow a deckhand to extend at least one of the following, one or more fingers and a thumb, through the loop to grab the loop.

12. The coupler of claim 1 wherein the loop of the appendage has a surface configured to reduce slipping when a deckhand grips or stands on the loop.

* * * * *